April 12, 1966   F. M. DARROW ET AL   3,246,244
APPARATUS FOR DETERMINING THE FIELD PATTERN OF A HIGH
FREQUENCY RADIATION FIELD
Filed Dec. 10, 1962
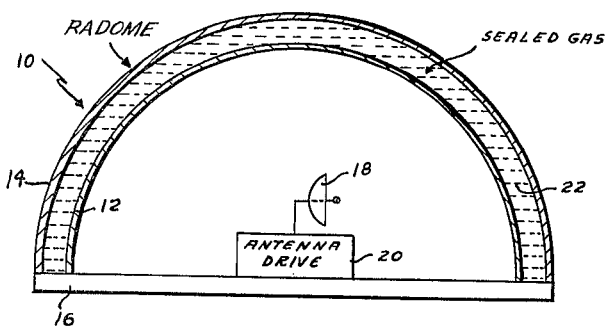
Fig-1
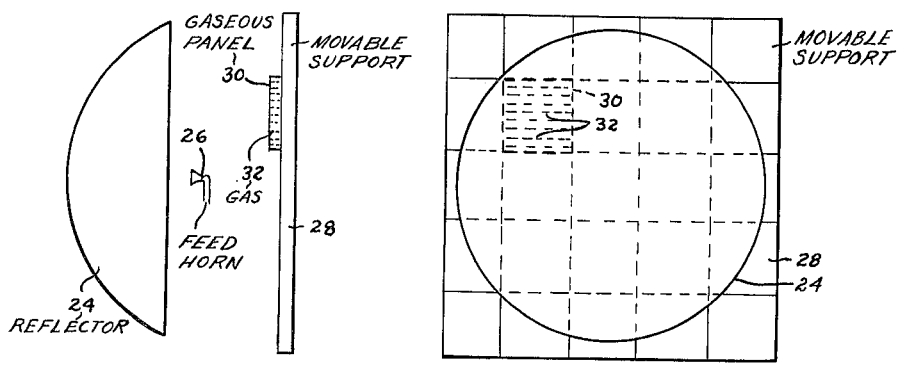
Fig-2   Fig-3
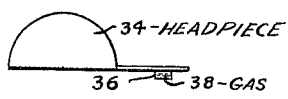   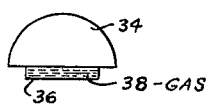
Fig-4   Fig-5
INVENTORS
FRANK M. DARROW
KENNETH G. EAKIN, DECEASED
BY MARGARET EAKIN, EXECUTRIX
BY
*Wade Loomty*
ATTORNEY United States Patent Office 3,246,244
Patented Apr. 12, 1966

3,246,244
APPARATUS FOR DETERMINING THE FIELD PATTERN OF A HIGH FREQUENCY RADIATION FIELD
Frank M. Darrow, 804 Sherman Place, Utica 4, N.Y., and Kenneth G. Eakin, deceased, late of Utica, N.Y., by Margaret Eakin, executrix, 297 Neville St., Perth Amboy, N.J.
Filed Dec. 10, 1962, Ser. No. 243,686
1 Claim. (Cl. 325—67)

This invention described herein may be manufactured and used by or for the United States Government for governmental purposes without payment to the patentees of any royalty thereon.

This invention relates to a gas ionization radiation detector for determining the levels of energy transmitted from an antenna in the near-zone region of the antenna.

Numerous investigations of the wave propagating characteristics of directive microwave antennas have been conducted in the past in order to determine the radiation pattern in the near- and far-zone regions. In most cases, the boundaries of the near- and far-zone regions of a field cannot be sharply defined. Generally, the near-zone region is considered to exist in the immediate neighborhood of the antenna whereas the far-zone is entered as the distance from the antenna increases. Conclusive solutions as to the nature of near-field phenomena are for the most part difficult to obtain. Similar difficulties usually arise in attempting to secure sound approximations involving the far-field distribution of the antenna system. Whenever possible, qualitative field distribution information is acquired by actual measurement of the radiation and reception characteristics of the antenna and one method is to use a test aircraft operating in the regions of interest. Such a procedure understandably is costly and time consuming because of the personnel, support equipment, and aircraft involved. However, from such measurements and through calculations affecting the wave patterns at varying distances from the antenna site, it has been possible heretofore to determine with reasonable clarity the specifications of the field distribution pattern both very close to and at greater distances from the antenna.

Accordingly, one object of the invention is to determine the near-zone region radiation pattern of a source radiating electromagnetic energy.

Another object of the invention is to provide a visual or photographic record of the radiation pattern of a radiating source in the near-zone region.

A further object of the invention is to provide a convenient and relatively inexpensive solution to the problems of determining the power distribution in the near-zone region of a radiating source.

One other object of the invention is to determine the far-zone radiation pattern of a radiating source through correlation with measurements giving the near-zone region pattern.

To accomplish the foregoing objects, the radiation characteristics of an antenna beam in the near-zone region of the antenna are determined by visually observing the development of so-called "hot spots" which are characterized by abrupt increases in signal intensity caused by uneven distribution in the radiation pattern. In the present invention, the "hot spots" arise through the effects of radiated energy on an ionizable medium and these effects are recorded visually or reduced to a permanent record by photography of later analysis.

Complete understanding of the invention and an introduction to other objects and features not specifically mentioned may be had from the following detailed description of several embodiments thereof when read in conjunction with the appended drawings wherein:

FIG. 1 shows an embodiment of the invention for determining the field distribution in the near-zone region of an antenna;
FIG. 2 shows a second embodiment of the invention;
FIG. 3 is a side view of FIG. 2 looking from the left-hand end, and;
FIGS. 4 and 5 show an arrangement illustrative of a further use of the invention.

Referring now to FIG. 1, where a gas ionization radiation detector in accordance with the invention is shown, the reference character 10 generally designates a translucent essentially hemispherical radome of double-wall construction which comprises circularly curved walls 12 and 14 supported in spaced relation and at a uniform distance from each other. The walls terminate against a plate 16 which completes an enclosure for a directional antenna 18. An antenna drive device 20 of suitable type mounts antenna 18 and is operated to establish the desired directivity of the antenna beam in any manner well known to the art. The space between the walls is sealed against the surrounding atmosphere. Injected in the space between walls 12 and 14 is an ionizable medium, such as a gas 22, presented in sufficient quantity and under adequate pressure to permeate completely the space between the walls. The distance between the radiating aperture of antenna 18 and the inner wall 12 is established in such manner that the radome enclosing the gas medium may be regarded as being disposed substantially within the near-zone region of antenna 18.

In transmission, the intensity of the E-plane component of the wave radiating from antenna 18 ionizes the gas selectively according to the distribution pattern of the radiation, whereby a visible image of the radiation pattern of the near-zone region of antenna 18 is formed. An explanation of zone patterns of aperture rays of the type under consideration in the present invention is given in MIT Radiation Laboratory Series, volume 12, Chapter 6. More explicitly, FIG. 6.2 on p. 173 of the cited work defines the near-zone pattern of radiated energy as one generally characterized by fluctuations in intensity due to interference effects of the phase fronts in the near field. In the apparatus of FIG. 1, it is the random behavior of the phase fronts of the radiation energy in the near-zone region which causes the occurrence of "hot spots" as evidence by the ionization of the gas. The ionization will, of course, be apparent to the eye. If desired, the ionization pattern may be reduced to a permanent record for each test by photography. Other suitable recording devices useful in detecting gas ionization may also be applied for this purpose.

It readily becomes apparent from the above discussion that by experimentally varying the pressure of the gas contained in the radome and controlling the radiation level of the energy propagating from antenna 18, the value of the E-plane component of the radiation field required to cause the concentration of energy as evidenced by "hot spots" can accurately be determined. Moreover, at the conclusion of experimentation, the gas may be exhausted from the radome and the radome thereafter will serve merely in the customary capacity of a protective cover. If retained in the radome, some reflection of the radiated energy from the "hot spots" may occur. It is postulated, however, that the perturbation will not be sufficiently great to distort detrimentally the radiation pattern.

A second embodiment of the invention is shown in FIG. 2. There, 24 designates a fixed reflector of cylindrical parabolic from having a feed horn 26 for illuminating the reflector which, in turn, produces a collimated beam of rays. Spaced from reflector 24 a variable distance and being adapted for reciprocal movement toward and away from reflector 24 in parallel relation to the wave axis of beams from the reflector, is a support member 28, mounted conveniently on any suitable mobile device (not shown) in a manner to establish a proper spatial relation between the reflector and support member in order to place support member 28 substantially in the near-zone region. Movable on the support 28 is a flat, hollow panel 30 filled with a gas 32 selected as having the property that the gas becomes ionized at a particular energy level of the beam from reflector 24. A grid network on support 28 having dimensions which overlap the overall width of the beam from reflector 24 defines a number of grid positions. Consequently, in each grid position, panel 30 intercepts a fraction of the total power fed from horn 26. Once the desired separation of the reflector and support 28 is established, panel 30 is moved selectively to discrete points of the grid array, the energy of the E-plane component of the beam intercepted by panel 30 causing selective ionization of the gas 32 in accordance with the radiation pattern at the point or points of interception. By thus exposing panel 30 to the radiation passing through specified areas in the near-zone region and observing the resulting ionization, the power distribution in the near-zone region may be plotted based on the grip coordinates. Of course, the ionization phenomena can be viewed directly. More lasting evidence of the radiation pattern may be achieved by photographing the ionization effects at each panel position.

It will be appreciated that attachment of panel 30 to support 28 when a stationary relation therebetween is required may be accomplished in any way deemed desirable. The ready mobility of support 28 and the equal mobility of panel 30 in FIG. 2 lends this arrangement to flexibly completing near-zero region tests for relatively large radiating sources.

A further use of the invention, illustrated in the arrangement of FIGS. 4 and 5, is applicable particularly in connection with occupations or experimentations in which personnel may suffer exposure to potentially hazardous radiation. As shown in these figures, 34 designates a protective safety helmet. Attached to the underside of the bill of the helmet 34 is a long slender tube 36 filled with an ionizable gas 38 capable of ionizing at a particular energy level whose value depends on environmental conditions and the type and strength of the radiation anticipated. The gas 38 will ionize and glow responsive to excessive radiation deemed injurious and the sudden brightness thus imparts to the wearer of the helmet a visual indication of a possibly dangerous radiation environment. In an alternative form, a double-walled and gas-filled face mask may be worn such as in the manner of the welder's mask. Upon initial ionization of the gas under radiation bombardment, the ionization field developing in the mask will prevent further radiation from penetrating to the facial region while simultaneously conveying a visual indication of the dangers involved.

Although several embodiments of the invention have been illustrated and described, it will be apparent to those skilled in the art that various charges and modifications may be made without departing from the spirit of the invention or the scope of the appended claim.

We claim:

Radiation detecting apparatus for determining the field distribution pattern of electromagnetic waves comprising a parabolic reflector to emit said waves, a support member disposed in energy-receiving relation with said reflector and lying in a plane perpendicular to the axis of said reflector, the surface of said support member nearest to said reflector having rectangular coordinates marked thereon which extend to an area slightly greater than the area defined by the opening of said reflector, said support member being axially displaced from said reflector and being movable along said axis toward and away from said reflector in order to place said support member substantially in the near zone region of said reflector, a single panel having a sealed compartment, said panel mounted on said surface of said support member for adjustment perpendicularly to the axis of said reflector sufficient to cover the area enclosed by said rectangular coordinates, and an ionizable gas enclosed in said compartment having no initial ionization and becoming ionized solely by the waves transmitted by said reflector to produce a glow image of the field distribution pattern of said reflector.

References Cited by the Examiner

UNITED STATES PATENTS

| | | | |
|---|---|---|---|
| 2,155,471 | 4/1939 | Cawley | 315—150 X |
| 2,337,968 | 12/1943 | Brown | 325—67 |
| 2,395,850 | 3/1946 | Colman. | |
| 2,509,045 | 5/1950 | Salisbury | 343—703 |
| 2,532,175 | 11/1950 | Linder | 343—17 X |
| 2,568,927 | 9/1951 | Morrison | 325—67 |
| 2,611,894 | 9/1952 | Rines | 315—34 X |
| 2,673,343 | 3/1954 | Rines | 343—17 |
| 2,711,530 | 6/1955 | Rines | 343—17 |
| 3,067,331 | 12/1962 | Hess et al. | 250—83.3 |
| 3,075,081 | 1/1963 | Landsverk et al. | 250—83.3 |
| 3,076,914 | 2/1963 | Meahl | 315—248 |

OTHER REFERENCES

Brueckmann: Electronics, November 1955, pp. 134–136.

DAVID G. REDINBAUGH, *Primary Examiner.*

J. W. CALDWELL, *Assistant Examiner.*